UNITED STATES PATENT OFFICE.

SAMUEL H. COCHRAN, OF EVERETT, MASSACHUSETTS.

PREPARING ANIMAL FATS FOR CULINARY USES.

SPECIFICATION forming part of Letters Patent No. 262,207, dated August 8, 1882.

Application filed June 28, 1882. (No specimens.)

*To all whom it may concern:*

Be it known that I, SAMUEL H. COCHRAN, a citizen of the United States, residing at Everett, in the county of Middlesex and State of Massachusetts, have discovered a new and improved compound to be used as a substitute for butter and lard in cooking uses; and I do hereby declare that the following is a full, clear, and exact description of the same.

Since the issuing of Letters Patent granted to me of date June 6, 1882, and numbered 258,992, for a compound to be used in the place of butter and lard for cooking purposes, I have discovered that the fat obtained from swine can be rendered, purified, and deodorized in the same manner as beef-suet by mixing with the fat while being rendered slippery-elm bark, as described in said Letters Patent, in the manner following, viz: Take the crude fat, trim and cleanse it in any of the well-known ways of easy rendering, place the same in steam-jacket or other vessels for rendering fats, and subject the same to heat at low temperature—say from about 150° to 200° Fahrenheit—and keep the same in constant agitation until the whole is sufficiently rendered. To purify and at the same time take out the offensive odor of this fat while the same is being rendered, and also to hasten the settling of the scraps, sift in about one three-hundredth part of ground or powdered slippery-elm bark. The effect of the slippery-elm bark thus introduced is to cause the scraps and other impurities to settle almost immediately to the bottom of the kettle and the offensive odor to disappear. The clear oil so obtained may then be drawn off to form a part of the compound. Then take cotton-seed oil or an equivalent vegetable oil purified as described substantially in my said Letters Patent, to wit: Place the oil in vessels to be heated, and while the same is being heated mix in the oil from one-seventieth to one-eightieth part of powdered or ground slippery-elm bark. Then subject the same to heat from about 190° to 200° Fahrenheit for about an hour and a half, causing the same to be kept in constant agitation, and let the oil cool for eight or ten hours, and then draw it off. Then take beef-stearine, which is prepared in the following manner: Render the beef-suet in suitable kettles at a low temperature until the suet becomes liquefied, and draw off the clear oil into a cooling-tank, and allow the oil to cool until it becomes granulated or thick. Take folding bags made of cloth suitable for the purpose, and place one or two pounds of granulated oil upon the cloth unfolded, and then fold the ends of the cloth over the granulated oil so the folded bag shall be about five inches by six inches in size, and lay the bags on the bottom of the press, and thus lay the bags in series one above the other until the press is full. Then, gently at first, bring pressure to bear upon the bags, and increase the pressure until the oleine and margarine constituents of the oil are pressed out through the bags. The remaining constituent of the oil is left in a white, solid cake, and this is stearine.

To form the compound, take about sixty-eight parts of cotton-seed oil or other vegetable oils, about twenty-eight parts of the prepared swine-fat, and about five parts of beef-stearine, and place the same in vessels to be heated, and heat the mass to about 160° Fahrenheit, keeping the mass in constant agitation for about a half hour. Then draw off the compound into a cooling-tank, stirring it all the while until it is cooled to about the consistency of cream. It is then ready for market-packages.

I am not confined to exact degrees of heat in treating the compound; nor am I confined to the exact proportions herein named.

I do not claim the inventions patented to Henry W. Bradley, of dates January 3, 1871, No. 110,626, and October 3, 1871, No. 120,026, for "improvement in compounds for culinary use," and "improvement in shortening for culinary uses."

What I claim is—

1. The described method or process of purifying and deodorizing oil obtained from swine-fat, which consists in mixing therewith slippery-elm bark, substantially in the proportions and in the manner and for the purpose shown and described.

2. The compound composed of the oil obtained from swine-fat, cotton-seed oil and its equivalents, deodorized and purified by slippery-elm bark and beef-stearine, substantially in the proportions and in the manner and for the purpose described.

SAMUEL H. COCHRAN.

Witnesses:
J. L. NEWTON,
R. F. NAYLOR.